United States Patent [19]

Turner

[11] Patent Number: 5,778,028

[45] Date of Patent: *Jul. 7, 1998

[54] DC REMOVAL CIRCUIT FOR DIGITAL SIGNAL

[75] Inventor: Rudolf Turner, Hawthorn Woods, Ill.

[73] Assignee: Zenith Electronics Corporation, Glenview, Ill.

[*] Notice: The term of this patent shall not extend beyond the expiration date of Pat. No. 5,475,714.

[21] Appl. No.: 569,975

[22] Filed: Dec. 8, 1995

Related U.S. Application Data

[63] Continuation-in-part of Ser. No. 259,284, Jun. 13, 1994, Pat. No. 5,475,714.

[51] Int. Cl.$^6$ .................................................. H03H 7/30
[52] U.S. Cl. ................................... 375/229; 375/316
[58] Field of Search ............................. 375/286, 292, 375/293, 229, 231, 316, 317, 319, 345; 327/307; 348/257, 677, 689; 341/126, 139, 155

[56] References Cited

U.S. PATENT DOCUMENTS

| | | | |
|---|---|---|---|
| 4,071,829 | 1/1978 | Davis et al. | 375/345 |
| 4,878,232 | 10/1989 | Fisher | 375/362 |
| 4,972,189 | 11/1990 | Polito et al. | 341/126 |
| 4,985,900 | 1/1991 | Rhind et al. | 375/371 |
| 5,416,524 | 5/1995 | Citta et al. | 348/471 |
| 5,475,714 | 12/1995 | Turner | 375/293 |
| 5,565,932 | 10/1996 | Citta et al. | 348/678 |

Primary Examiner—Don N. Vo

[57] ABSTRACT

A DC removal circuit for removing residual DC from a digitally encoded television signal including a plurality of multi level data symbols occurring at a constant symbol rate and formatted in repetitive data fields, each field including repetitive data segments having data segment sync of a fixed pattern of four symbols. A derived value of DC is subtracted from each of the received data symbols. The output of the subtractor is sampled, at the symbol rate or at one-half the symbol rate, and the sampled output is accumulated in an accumulator for generating the derived value. The sampling is continuous. The accumulator is preset to a zero value upon tuning to a different channel. An equalizer is supplied with the derived value of DC.

12 Claims, 1 Drawing Sheet

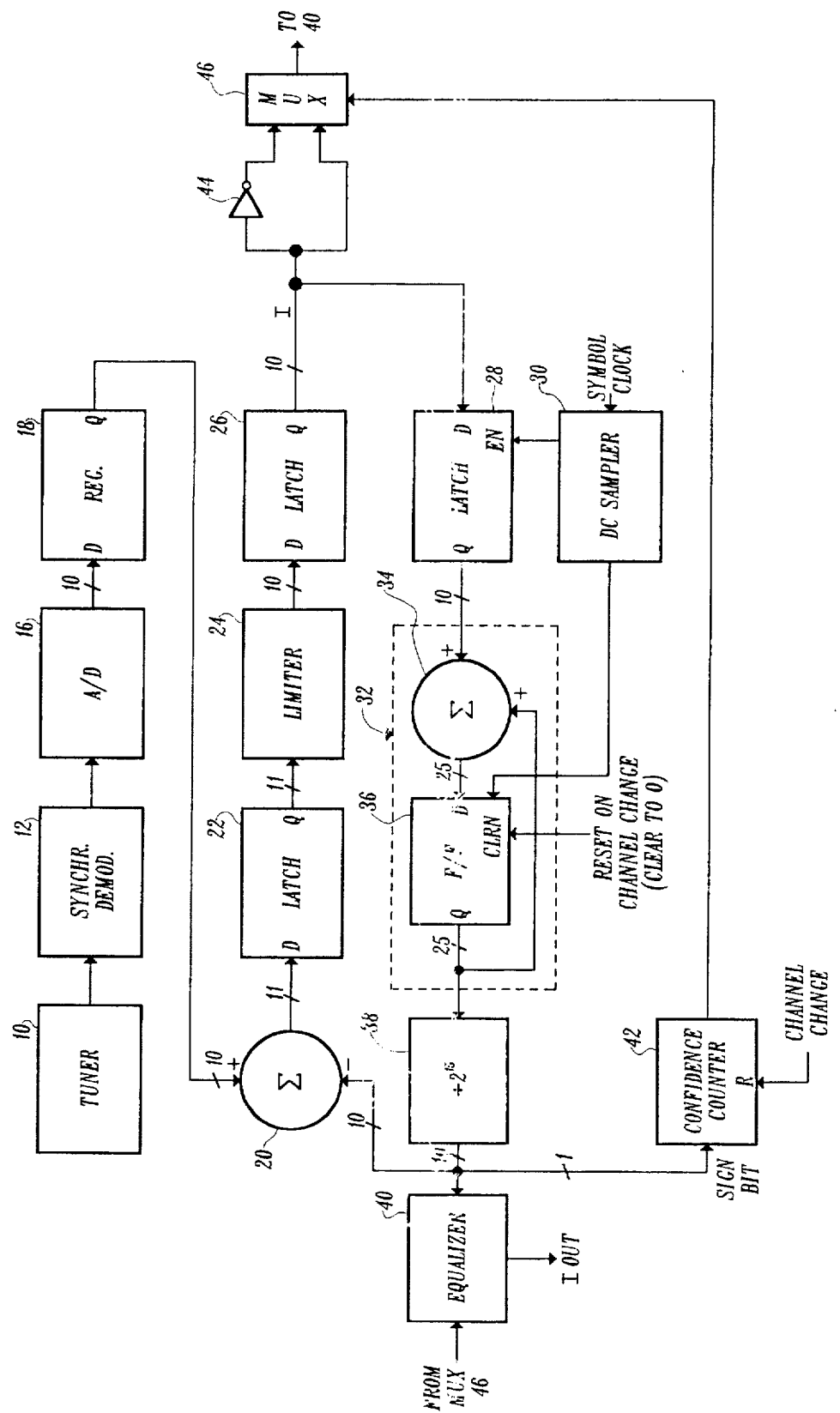

DC REMOVAL CIRCUIT FOR DIGITAL SIGNAL

CROSS REFERENCE TO RELATED APPLICATIONS

This application is a continuation-in-part of application Ser. No. 08/259,284, filed Jun. 13, 1994 now patent 5,475,714.

BACKGROUND OF THE INVENTION AND PRIOR ART

This invention concerns the removal of DC from a digitally encoded signal comprising a plurality of multi level constant rate data symbols. The data symbols are formatted in repetitive data fields and have a repetition rate of $F_r$, with each field being organized into a plurality of repetitive data segments, each of which includes a data segment sync signal. The digitally encoded signal is transmitted in analog form and, in the preferred embodiment, includes a DC offset that represents a pilot. The pilot is recovered in the receiver and used to synchronize and lock up the received signal. The DC offset may be removed before the signal is applied to an analog to digital (A/D) converter, which optimizes the use of the A/D converter, or it may be processed and used in conjunction with a signal equalizer as in the present application. The converted signal is supplied to digital processing circuitry where the signal is sliced to recover the symbol levels. The recovered symbols are arranged in digital bytes, deinterleaved to undo the error protection and interleaving performed at the transmitter, and applied to a Reed Solomon decoder for error correction to achieve the correct symbols. These symbols are used to develop the video, audio and auxiliary data.

The method and apparatus of the invention removes the DC pilot and any residual DC that finds its way into the signal due to the digital processing components and the integrated circuit format. In the digital domain, even such small residual DC components can be very detrimental. Also, in another aspect of the invention, the derived DC that is used for removal purposes is used to equalize the input signal. The derived DC may further be used to control selective inversion of the received signal.

OBJECTS OF THE INVENTION

A principal object of the invention is to provide a novel processing circuit for a digital signal having multi level data symbols.

Another object of the invention is to provide a method of removing DC from a digital signal having multi level data symbols.

A further object of the invention is to provide a simple automatic DC removal circuit for a digital signal having multi level data symbols.

Yet another object of the invention is to provide a method of processing and equalizing a digital signal.

BRIEF DESCRIPTION OF THE DRAWING

These and other objects and advantages of the invention will be apparent upon reading the following description in conjunction with the drawing, the single figure of which is a partial block diagram of a television receiver incorporating the invention.

DESCRIPTION OF THE PREFERRED EMBODIMENT

A tuner 10 receives a transmitted digitally encoded signal comprising a plurality of multi level data symbols organized in a repetitive field format with each field including a plurality of repetitive data segments, each having a data segment sync character. The signal may be a television channel and may be received terrestrially, i.e. over the air, or via a cable from a cable head end. The tuner 10 selects the desired one of the incoming television channel signals and supplies it to a synchronous demodulator 12, where it is demodulated. The demodulated signal, including the DC offset, is applied to an A/D converter 16. As mentioned above, the DC offset is used by the synchronous demodulator 12 to lock up the received signal. The signal is converted into digital form with the number of bits in the digital signal being indicated by the numbers adjacent the slashed lines in the drawing. The 10 bit digital signal from A/D converter 16 is applied to a 10 bit wide register 18, the output of which is supplied to a subtractor 20 where a derived value is subtracted, as will be described. (In a cable environment, an 8 bit digital signal is preferably used.) The output of subtractor 20 is an 11 bit number which is applied to a register or latch 22, the output of which is applied to a limiter 24 where the 11 bit number is processed back to a 10 bit number. The output of limiter 24 is applied to another latch 26 which supplies the I signal (with DC removed) to an equalizer 40 through a selective inverting circuit comprising an inverter 44 and a multiplexer 46.

Latch 26 is operated at the symbol rate $F_s$. The output of latch 26 is also applied to another latch 28 which is driven from a DC sampler circuit 30. DC sampler 30 is driven by the symbol clock and divides the symbol clock signal by N where N is an integer. The 10 bit number output of latch 28 is applied to an accumulator 32. Accumulator 32 includes an adder 34 and a flip/flop 36. Adder 34 receives the 10 bit number from latch 28 and supplies a 25 bit "padded" number to the D input of flip/flop 36. The 25 bit Q output of flip/flop 36 is connected back to the input of adder 34, where it is added. The flip/flop 36 is clocked by a clocking signal at a 684 H/N rate from DC sampler 30 where H is the NTSC horizontal scanning rate. A reset signal is applied to CLRN of flip/flop 36. The function of accumulator 32 is to accumulate the DC values of the sampled symbols on a continual basis. The output of accumulator 32 is a 25 bit number that is applied to a divider 38 where it is divided by a factor of $2^{15}$ (which division consists of dropping the fifteen least significant bits). The output of divider 38, which represents the composite DC of the received signal, is applied to subtractor 20 and used to control equalizer 40 from which the I output signal is obtained. Details of the operation of equalizer 40 may be found in copending application Ser. No. 08/539,155, filed Oct. 4, 1995. Flip/flop 36 is reset in response to a channel tuning change occurring in tuner 10. When flip/flop 36 is reset, it is cleared to zero. (If the polarity of the recovered signal is known, the accumulator may be preset to the known value of the pilot, which will speed up the operation of the circuit). The sign bit of the signal from divider 38 is applied to a confidence counter 42, which is reset in response to the channel change signal, the output of confidence counter 42 controlling multiplexer 46 to select either the inverted or non-inverted I signal from the output of latch 26. This is necessary because synchronous demodulator 12 can lock in either one of two polarities. Confidence counter 42 may count eight consecutive sign bits of the same polarity before changing the state of multiplexer 46.

In the preferred embodiment, the circuit operates at the symbol rate $F_s$ and neither latch 28 nor DC sampler 30 is necessary. Lower rates, such as one-half, one third, etc. of the symbol rate may be used for economy or if the necessary speed of operation for the accumulator is unavailable. Hence for anything but operation at the symbol rate, latch 28 and DC sampler 30 are required. Preferably N is either 1 or 2. (If N is 1, latch 28 and sampler 30 are not required.) Where N is an integer greater than 2 however, a certain amount of error is introduced due to sampling the repetitive segment sync pattern. In the encoded signal, the segment sync comprises four symbols in a pattern of high, low, low and high (for each segment). Also, the random data will average out to zero, except for the constant DC pilot signal or other DC offsets introduced in the receiver. Therefore a rate that would sample every one, or every other one, of the segment sync symbols would have a net effect of zero. Therefore, a sample rate equal to the symbol rate or equal to one-half of the symbol rate is desirable. While a sample rate equal to the symbol rate is preferred, a sample rate of one-half the symbol rate will also work, although being slower and less accurate. Sample rates of one-third or one-fourth of the symbol rate are also effective even though some error will occur due to the resultant sampling of the constant pattern segment syncs.

Thus, with the present invention there is no need to avoid sampling the segment sync and there is no need to synchronize operations with respect to the segment sync.

In operation, as the input signal emerges from register 26, it is sampled and the magnitudes of the sampled signals are accumulated by accumulator 32. The output of the accumulator is divided and continually updates the derived value of DC that is to be subtracted from the incoming signal in accordance with its input. Therefore, a DC signal, which is based upon the average of the accumulated symbol samples, is subtracted from the incoming signal in subtractor 20 and also supplied to the equalizer 40. Under normal conditions, the symbol values will average out to zero, that is there will be as many symbols on the positive side of a zero axis as on the negative side. (The DC pilot and any residual DC will not average out.) The sampling and accumulating arrangement increases the derived value of DC that is subtracted from the incoming signal to compensate for the pilot and any residual DC, thus tending to stabilize the incoming signal at a zero DC point. The speed of operation of the circuit is determined by the sample rate and the divide ratio of the divider 38. Since the sampling arrangement in the preferred embodiment operates at the symbol clock frequency and uses a divide ratio of $2^{15}$, very rapid corrections can be made, which is very desirable when fast moving ghosts are encountered. The divide ratio in divider 38 determines how many segments of samples are averaged, which in turn determines the speed of operation.

The value $2^{15}$ was found to be optimum for tracking moving ghosts where the accumulator 32 is operated at the symbol rate. For example, with a 1.0 microsecond 5.0 Hz doppler, −7 dB ghost, a DC of 30 in a range of +511 to −512, in two's complement format took 118 segments to compensate where one segment was equal to 832 symbols.

What has been described is a novel DC removal circuit for removing residual DC in a digital signal comprising a plurality of multi level symbols occurring at a fixed rate. It is recognized that numerous changes in the described embodiment of the invention will be apparent to those skilled in the art without departing from its true spirit and scope. The invention is to be limited only as defined in the claims.

What is claimed is:

1. A method of removing DC from a digitally encoded input signal comprising a plurality of multi level data symbols received at a constant symbol rate comprising:

subtracting a derived value from each of the data symbols for removing the DC component of each encoded input signal and producing a subtracted signal output;

sampling said subtracted signal output at said symbol rate or at one-half said symbol rate; and accumulating the samples for generating said derived value.

2. The method of claim 1 wherein said encoded input signal is a television channel and further comprising restarting said accumulating step from a preset value upon tuning to a different television channel.

3. The method of claim 2 wherein said encoded input signal includes a DC pilot and wherein said preset value equals zero.

4. The method of claim 1 wherein said encoded input signal includes segment sync having a fixed pattern of four symbols and wherein said sampling also samples said segment sync.

5. The method of claim 1 wherein said sampling is continuous throughout said subtracted signal.

6. A DC removal circuit comprising:

means for receiving a digitally encoded input signal comprising a plurality of multi level data symbols having a constant symbol rate and having levels above and below a zero value;

subtracting means for subtracting a derived value from each of said multi level data symbols for substantially removing the DC component of said encoded input signal;

means for sampling the output of said subtracting means at said symbol rate or at one-half said symbol rate; and means for accumulating the samples for generating said derived value.

7. The circuit of claim 6 wherein said encoded input signal is a tuned television channel, and further including:

means for resetting said accumulating means upon tuning to a different television channel.

8. The circuit of claim 7 wherein said resetting means presets said accumulating means to a value of zero.

9. The circuit of claim 6 wherein said encoded input signal includes segment sync having a fixed pattern of four symbols and wherein said sampling means also samples said segment sync.

10. The circuit of claim 6 wherein said sampling means operates continuously on said output of said subtracting means.

11. A method of processing a digitally encoded input signal comprising a pilot and a plurality of multilevel data symbols received at a constant symbol rate, comprising:

sampling said encoded signal at a rate equal to or less than the symbol rate;

accumulating the samples for developing a DC signal representing said pilot; and using said DC signal to equalize said input signal.

12. In combination:

an equalizer;

means for receiving a digitally encoded signal comprising a pilot and a plurality of constant rate multilevel data symbols;

means for sampling said encoded signal at a rate equal to or less than the symbol rate;

means for accumulating the samples for developing a DC signal representing said pilot; and means for applying said DC signal to said equalizer.

* * * * *